United States Patent [19]
Hirai et al.

[11] Patent Number: 5,195,932
[45] Date of Patent: Mar. 23, 1993

[54] COMPACT COIL SPRING TENSIONER

[75] Inventors: Hideo Hirai, Kakogawa; Masakatsu Ando, Kobe; Yasuhiro Hashimoto, Miki; Naoki Fujimoto, Kobe; Norikazu Tanaka, Osaka; Susumu Yamakawa, Kobe, all of Japan

[73] Assignee: Mitsuboshi Belting, Kobe, Japan

[21] Appl. No.: 421,259

[22] Filed: Oct. 12, 1989

Related U.S. Application Data

[63] Continuation-in-part of Ser. No. 412,941, Sep. 26, 1989, Pat. No. 4,983,145.

[30] Foreign Application Priority Data

Oct. 13, 1988 [JP] Japan .................. 63-258870
Dec. 15, 1988 [JP] Japan .................. 63-318201

[51] Int. Cl.⁵ ........................................... F16H 7/12
[52] U.S. Cl. ............................................... 474/135
[58] Field of Search ............... 474/133, 135, 139, 174, 474/175, 177, 179

[56] References Cited

U.S. PATENT DOCUMENTS

| | | | |
|---|---|---|---|
| 2,139,397 | 3/1987 | Wigglesworth . | |
| 4,277,077 | 7/1981 | Ozaki | 474/80 |
| 4,285,676 | 8/1981 | Kraft | 474/135 |
| 4,362,525 | 12/1982 | Sproul | 474/117 |
| 4,464,146 | 8/1984 | Arthur | 474/135 X |
| 4,525,152 | 6/1985 | Speer et al. | 474/133 |
| 4,583,962 | 4/1986 | Bytzek et al. | 474/133 |
| 4,661,087 | 4/1987 | Henderson | 474/117 |
| 4,723,934 | 2/1988 | Thomey | 474/135 |
| 4,983,145 | 1/1991 | Hirai et al. | 474/135 X |

Primary Examiner—Ramon S. Britts
Assistant Examiner—Roger J. Schoeppel
Attorney, Agent, or Firm—Wood, Phillips, Van Santen, Hoffman & Ertel

[57] ABSTRACT

An apparatus is provided for tensioning a drive belt, which apparatus consists of tensioner arm having an idler pulley thereon for engagement with the surface of a drive belt, structure for mounting the tensioner arm to a support for pivoting movement in first and second opposite directions relative to the support, and a torsion coil spring formed of wire and acting between the mounting structure and tensioner arm for biasing the tensioner arm in one of the first and second directions. The wire has a non-circular cross section.

22 Claims, 5 Drawing Sheets

COMPACT COIL SPRING TENSIONER

CROSS REFERENCE

This is a continuation-in-part of U.S. application Ser. No. 412,941, filed Sep. 26, 1989 entitled "Apparatus for Automatically Tensioning a Drive Belt" in the name of Hirai et al and currently issued as U.S. Pat. No. 4,983,145.

BACKGROUND OF THE INVENTION

1. Field of the Invention

This invention relates to automatic drive belt tensioning apparatus and, more particularly, to an apparatus of the type having a pivotable tensioner arm with an idler pulley thereon which is borne against an unsupported portion of a drive belt to create a predetermined tension thereon.

2. Background Art

It is conventional to use a belt tensioning apparatus on drive belt systems such as those in the automobile industry. The automobile systems are generally characterized as serpentine belt systems. In such systems, an endless belt is trained in a circuitous path about a plurality of accessories, such as pumps, alternators, etc. The belt frictionally drives pulleys associated with shafts on the accessories. For the accessories to operate consistently and effectively, it is necessary for the frictional drive force developed on the accessory pulleys to be relatively constant. This is conventionally accomplished by producing a predetermined tension on the belt through a belt tensioning apparatus.

Typically, such tensioners employ hydraulic or pneumatic mechanisms, rubber and a steel spring or resin, etc. to impart a desired tension on the belt through compression, tension, bending, or twisting.

One objective of automobile designers is to maximize the passenger compartment space and minimize the compartment space for the engine With the premium on space in the engine compartment, it is important that all engine components, including the belt tensioner, be made as small as possible without compromising the operation thereof.

As a rule, prior art tensioners have had a very substantial dimension both axially and radially with respect to the pivot axis for the tensioner arm. For example, U.S. Pat. No. 4,473,362, to Thomey et al, shows a belt tensioning apparatus with a coil spring 44 that exerts a torsional bias on a tensioner arm 78 to thereby bear an idler pulley 42 on the end of the arm 78 against a drive belt. Due to the large torsional force that the coil spring 44 must develop, the wire from which the spring 44 is formed is heavy gauge. The required torque that must be produced also necessitates a large number of coil turns with relatively large radii. The spring 44 in Thomey et al must also have considerable strength axially thereof to perform a biasing function as part of a damping mechanism. The result is that the overall dimensions of the belt tensioning apparatus become quite large to accommodate the spring 44.

One prior art inventor, Kraft, in U.S. Pat. No. 4,285,676 resorts to the use of multiple springs to produce the desired forces. The resulting dimensions of the tensioning apparatus, particularly radially of the tensioner arm pivot axis, become quite large.

The space problems are further aggravated by the provision in certain prior art structures, such as that in the above Thomey et al patent, of damping mechanisms to control pivoting of the tensioner arm. This damping feature is generally incorporated to prevent tensioner arm backlash and vibrations that may cause a resonant condition in the drive belt and/or tensioning apparatus, as may occur with abrupt acceleration in automobiles.

One such damping mechanism is shown in U.S. Pat. No. 4,362,525, to Sproul. Sproul has a damping mechanism 58 that is spaced a considerable distance away from the structure for biasing the tensioner arm 25 and associated idler pulley 35. This necessitates the provision of a large mounting bracket 10 which competes with other engine accessories for space Another known damping mechanism is that in U.S. Pat. No. 4,661,087, to Henderson, which employs a piston or blade to be operated in a liquid to create a damping force. A considerable amount of space is required for this mechanism as well.

SUMMARY OF THE INVENTION

The present invention is specifically directed to overcoming the above enumerated problems in a novel and simple manner.

According to the present invention, an apparatus is provided for tensioning a drive belt, which apparatus consists of a tensioner arm having an idler pulley thereon for engagement with the surface of a drive belt, structure for mounting the tensioner arm to a support for pivoting movement in first and second opposite directions relative to the support, and a torsion coil spring formed of wire and acting between the mounting structure and tensioner arm for biasing the tensioner arm in one of the first and second directions. The wire has a non-circular cross section.

It is the principal objective of the present invention to minimize the space requirements for a belt tensioning apparatus without compromising the performance thereof. This is accomplished by minimizing the space requirements for the torsion coil spring. Preferably, the cross section of the wire defining the torsion coil spring is square or rectangular. The square and/or rectangular wire is stronger than circular wire and can thus be used to develop the same torque and axial forces as a spring with a larger number of turns and larger radius made from wire having a circular cross section. Further, the torsion angle required to produce a given torque with a spring made from non-circular wire is less than that for circular wire for a given spring constant.

The present invention is also concerned with minimizing the size of a damping mechanism for the tensioner arm.

The tensioner arm has a mounting body with a first wall having a first surface facing in a first axial direction. The mounting structure for the tensioner arm has a second wall with a second surface facing the first surface. The mounting body has a third surface facing axially oppositely to the first direction to coact with a friction producing surface on the mounting structure. The torsion coil spring is compressed between the first and second surfaces and urges the third surface against the friction producing surface on the mounting structure to damp pivoting movement of the tensioner arm.

In an alternative form, a friction plate is mounted for axial movement relative to the mounting structure and fixed against rotation relative thereto. Structure independent of the torsion coil spring biases the friction plate axially towards a part of the tensioner arm to damp pivoting of the tensioner arm. A friction element, preferably of nylon resin, is interposed between the friction plate and the part of the tensioner arm.

To further compact the overall system, the friction plate has a stepped cylindrical configuration with a first portion having a first diameter and a second portion with a second diameter that is larger than the first diameter. A coil spring surrounds the first friction plate portion and bears against an axially facing surface on the second portion of the friction plate.

The invention also contemplates a simple and compact structure for positively holding the ends of coil springs used to create torsion between the tensioner arm and mounting structure therefor To accomplish this, there is a pin and socket arrangement between one spring end and the mounting structure and a like arrangement between the other spring end and tensioner arm. Alternatively, bores can be provided in the tensioner arm and mounting structure to receive the spaced coil spring ends. A still further alternative is the provision of posts on the tensioner arm and mounting structure against which the spring ends can releasably bear as the spring is loaded during assembly.

DETAILED DESCRIPTION OF THE DRAWINGS

Figure 1:
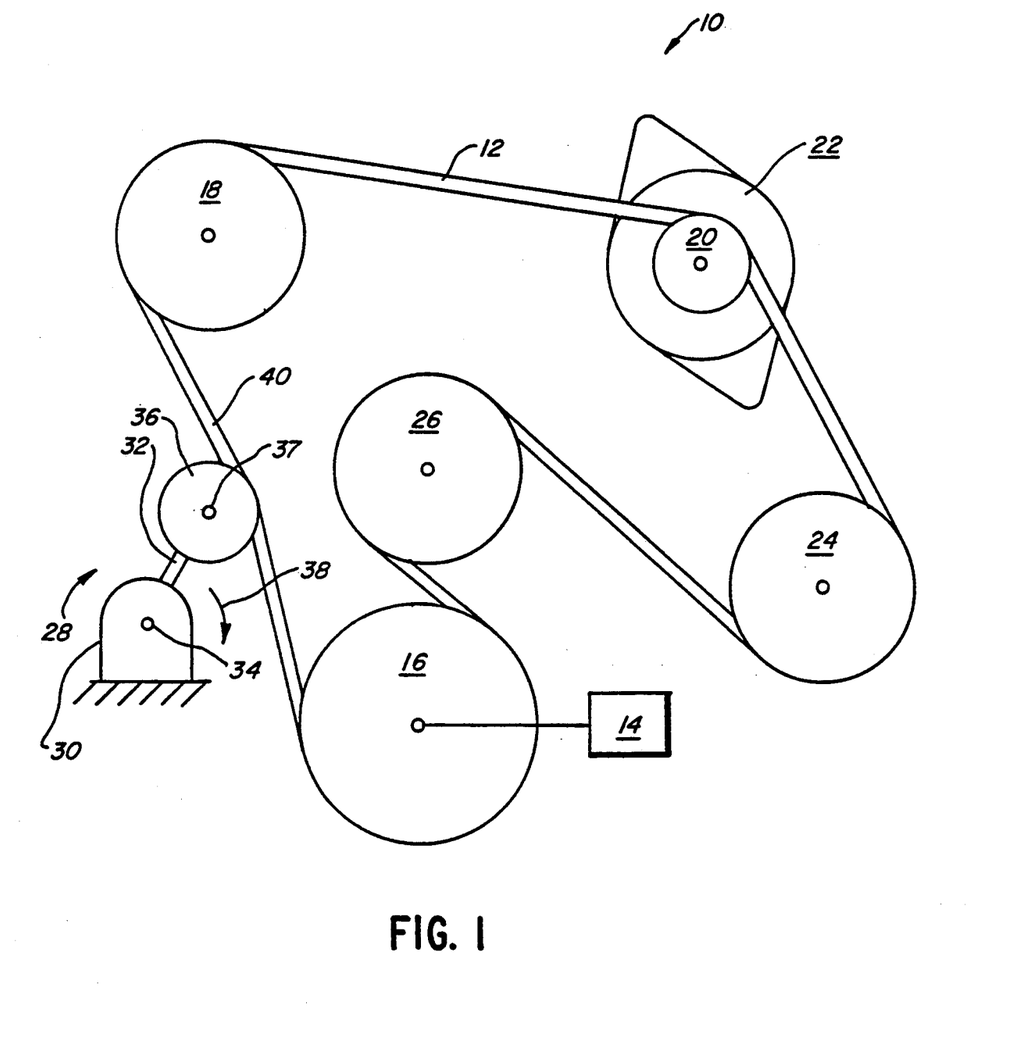
FIG. 1 is a schematic representation of a serpentine belt system in an automobile, with a belt tensioning apparatus according to the present invention incorporated therein.

An exemplary system with which an automatic belt tensioner, according to the present invention, can be incorporated, is shown in FIG. 1 at 10. The system 10 is what is generally characterized as a serpentine belt system wherein a single, endless belt 12 drives, in this particular system, four separate automobile accessories. An engine 14 operates, through a drive shaft (not shown), a driving pulley 16 which, through belt 12, drives a pulley 18 which is operatively connected to an air pump (not shown), a pulley 20 on the operating shaft of an alternator 22, a pulley 24 on a shaft which operates a power steering unit (not shown), and a pulley 26 operatively connected to the shaft of a water pump (not shown) for the engine 14.

The inventive belt tensioner, shown schematically in FIG. 1 at 28, has a fixed support 30, to which a tensioner arm 32 is attached for pivoting movement in first and second opposite directions, about a pivot axis 34. The tensioner arm 32 carries at its end an idler pulley 36, that is rotatable about an axis 37, which is parallel to the tensioner arm pivot axis 34. The tensioner arm 32 is resiliently biased in rotation in the direction of arrow 38 to bear the idler pulley 36 against an unsupported belt portion 40 between the driving pulley 16 and driven pulley 18, with a force calculated to cause a constant predetermined tension to be applied to the belt 12.

At startup of the engine 14 and the driving pulley 16, there is a tendency of the belt portion 40 to thrust the idler pulley 36 so as to pivot the tensioner arm 32 oppositely to the direction of arrow 38. Abrupt movement of the tensioner arm 32 oppositely to the direction of arrow 38 is undesirable and is prevented by the structure of the present invention, as described in detail below.

Figure 2:
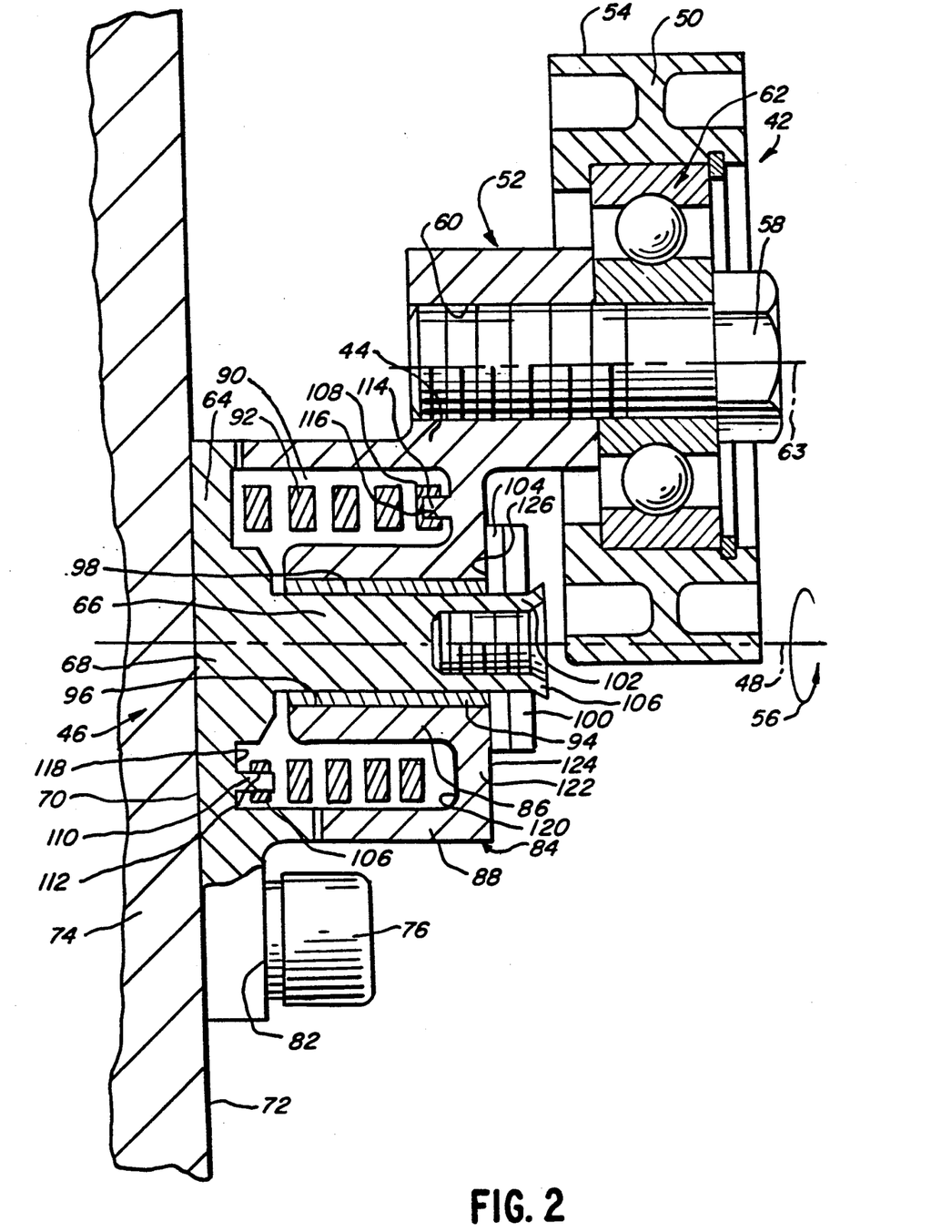
FIG. 2 is a side elevation view in section of a belt tensioning apparatus according to the present invention.
Figure 3:
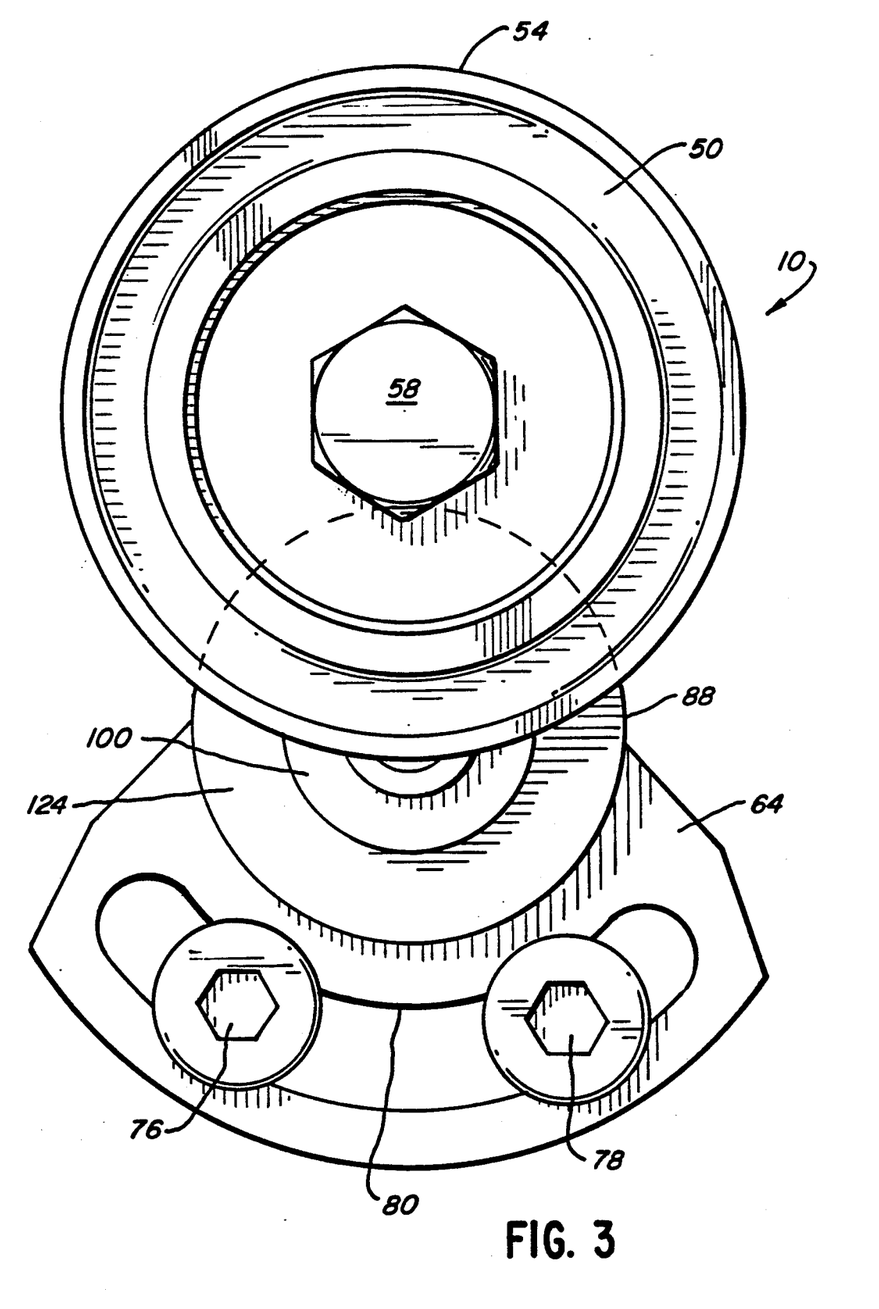
FIG. 3 is an end view of the belt tensioning apparatus of FIG. 2.
Figure 4:
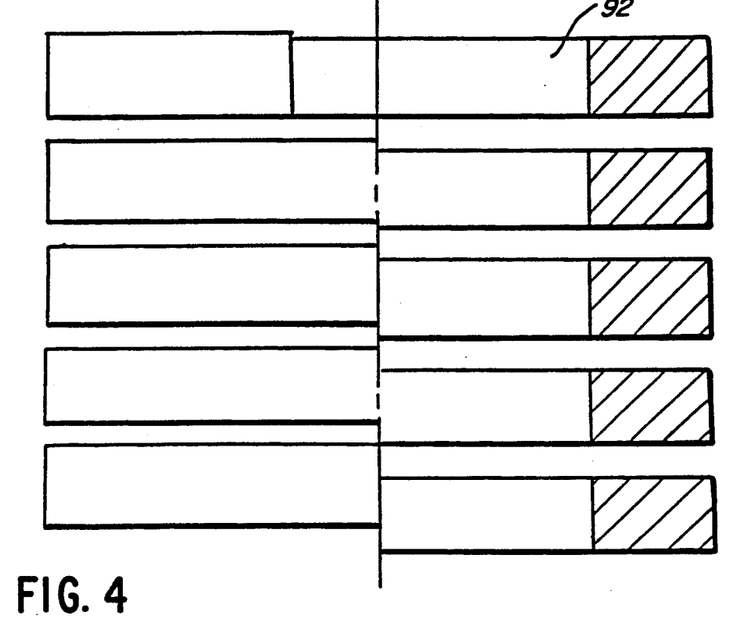
FIG. 4 is an enlarged, fragmentary view of a coil spring, partially in section, used to create a torsional biasing force on a tensioner arm on the belt tensioning apparatus of FIG. 2.

A preferred form of belt tensioning apparatus, according to the present invention, is shown at 42 in FIG. 2 and consists of a tensioner arm 44, which is rotatable relative to mounting structure, shown generally at 46, for rotation in first and second opposite directions about pivot axis 48. The tensioner arm 44 has an idler pulley 50 on its one end 52. The idler pulley 50 has a peripheral surface 54 which, in operation, is rotatably biased against a drive belt in the direction of arrow 56, i.e. counterclockwise as viewed from the right in FIG. 2.

The idler pulley 50 is journaled for rotation on the arm end 52 and is maintained in operative position by a bolt 58 which extends into a threaded bore 60 in the arm end 52. A ball bearing 62 on the arm end 52 assures smooth rotation of the idler pulley 50 about its rotational axis 63.

The mounting structure 46 for the tensioner arm 44 consists of a mounting plate 64 with a shaft 66 extending axially therefrom in cantilever fashion. The mounting plate 64 has a wall 68 with a flat surface 70 that is placed facially against the flat surface 72 of a fixed support 74.

The plate 64 is held against the support 74 by two bolts 76, 78, threaded into bores (not shown) in the support 74. The bolts 76, 78 extend through an arcuate slot 80 in the plate 64. The bolts 76, 78 each have enlarged heads with shoulders 82 that bear the plate 64 rigidly against the support surface 72. The arcuate slot 80 permits rotational adjustment of the position of the tensioning apparatus 42 relative to the belt (not shown).

The tensioner arm 44 has an integral mounting portion 84 which attaches to the mounting shaft 66. The mounting portion 84 has a generally cylindrical configuration with a radially inner wall 86 and a concentric outer wall 88, which walls cooperatively bound an annular space 90 for a torsion coil spring 92.

The mounting portion 84, in assembly, is directed axially over the mounting shaft 66. A cylindrical bushing 94 is interposed between the radially inwardly facing surface 96 of the inner wall 86 and the radially outwardly facing surface 98 of the shaft 66 and facilitates both rotational and axial movement of the tensioner arm 44 relative to the shaft 66.

The tensioner arm 44 is held on the shaft 66 by a locking washer 100. With the mounting portion 84 of the tensioner arm 44 operatively positioned on the shaft 66, the shaft end 102 projects sufficiently therefrom to accept both the washer 100 and a friction generating washer 104, made preferably of a nylon material. With the mounting portion 84 on the shaft 66 and the washers 100, 104 in place, the shaft end 102 can be deformed radially outwardly at 106 to a diameter greater than the diameter of the bores in the washers 100, 104, to prevent the escape thereof off of the end 102 of the shaft 66.

Figure 6:
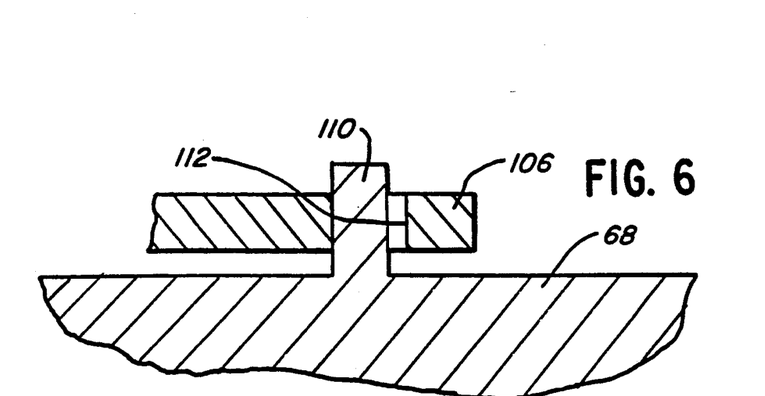
FIG. 6 is a view as in FIG. 5 with a pin and slot arrangement for the coil spring ends, which is an alternative to the FIG. 5 arrangement.

Biasing of the tensioner arm 44 in the direction of arrow 56 in FIG. 2 is accomplished by the coil spring 92. The coil spring 92 has spaced ends 106, 108 which are respectively attached to the mounting wall 68 and tensioner arm 44. FIGS. 2 and 6 show preferred structure for attached the spring ends 106, 108. A pin 110 projects axially from the wall 68 and into a socket 112 in the pin end 106. A similar pin 114 on the tensioner arm 44 is received in a socket 116 in the other pin end 108. By securing the pin ends 106, 108, as described, the spring 92 can be preloaded, by rotation of the tensioner arm 44, to produce a desired torque on the tensioner arm 44 in the direction of arrow 56.

The invention contemplates that the wire from which the spring 92 is formed be square or rectangular in cross section. The spring 92 is inherently more rigid than a spring made from a corresponding wire of circular cross section, as is conventionally used. Less turns in a smaller radius are required for the spring 92 than a corresponding spring made of circular spring wire This diminishes both the axial and radial dimensions of the spring 92 which results in a corresponding reduction in the overall size of the tensioning apparatus 42.

In addition to producing the required torque on the tensioner arm 44, the spring 92, in the FIG. 2 embodiment, also causes a damping force to be produced to control pivoting of the tensioner arm 44. The coil spring 92 is compressed between an axially facing surface 118 on the wall 68 and a facing wall surface 120 on a wall portion 122 connecting between the inner wall 86 and outer wall 88 on the mounting portion 84. The spring 92 thereby biases a third surface 124 on the mounting portion 84 axially against a friction generating surface 126 on the washer 104, which is rigidly backed by the washer 100. The damping force developed between the surface 124 on the mounting portion 84 and the surface 126 on the washer 104 is dictated by the compressive force from the spring 92. As the spring 92 is loaded, its effective axial extent and diameter are reduced. As the tensioner arm 44 pivots oppositely to the direction of arrow 56, the spring 92 is relaxed and thereby effectively lengthens in an axial direction so that the compressive force produced thereby tending to move the mounting portion 86 against the washer 104 is increased. Thus, damping increases progressively as the tensioner arm 44 moves away from a tensioning direction, i.e. oppositely to the direction of arrow 56.

Figure 5:
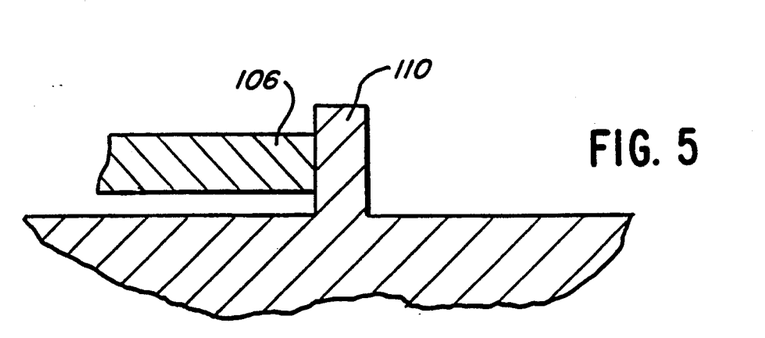
FIG. 5 is an enlarged fragmentary view showing an arrangement for abutting one end of the torsion coil spring of FIG. 4 to allow loading thereof.

FIG. 5 shows a slightly modified arrangement for fixing the spring ends 106, 108. Instead of having a socket 112 in the spring end 106, the spring end 106 merely abuts the pin 110 without any connection therebetween. The restoring force in the spring end 106 bears the spring end 106 against the post 110.

Figure 7:
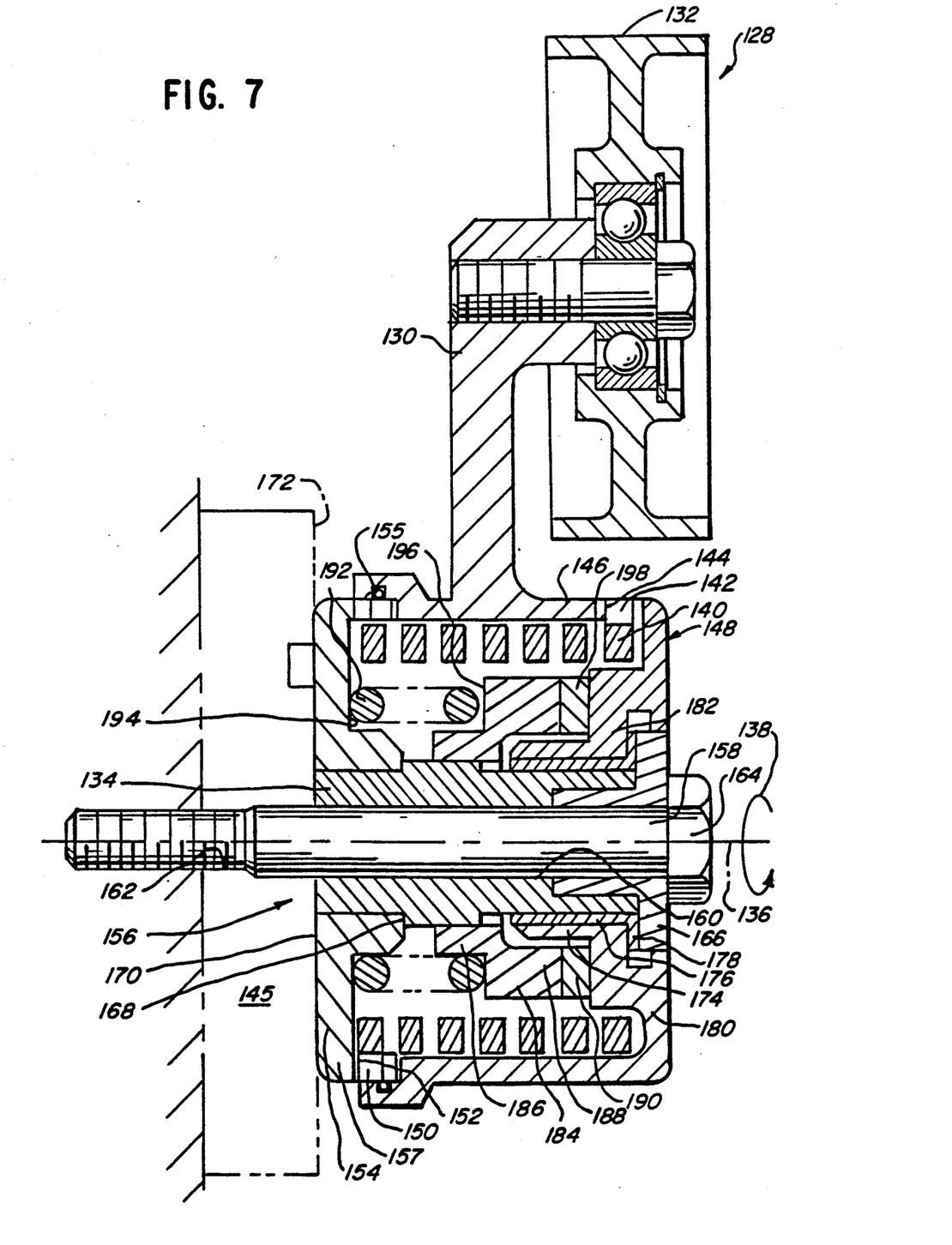
FIG. 7 is a side elevation view in section of a modified form of belt tensioning apparatus according to the present invention.

A modified form of belt tensioning apparatus, according to the present invention, is shown at 128 in FIG. 7. The belt tensioning apparatus 128 has a tensioner arm 130 with an idler pulley 132, that is pivotable about a shaft 134 centered on axis 136. Torque is exerted on the tensioner arm 130 in the direction of arrow 138 i.e. counterclockwise as viewed from the right in FIG. 7, by a loaded coil spring 140, made from wire with a non-circular cross section. The coil spring 140 has a free end 142 directed through a bore 144 in a peripheral wall 146 on a mounting portion 148 of the tensioner arm 130. The opposite spring end 150 is directed through a bore 152 in a mounting plate 154, which is rigidly secured to a fixed support 145 for the tensioning apparatus at 128. The wall 146 and a flange 157 on the plate 154 fit one within the other. An annular seal 155 is interposed between a radially enlarged part of the wall 146 and the flange 157 to prevent dust, etc. from migrating between the wall 146 and flange 157.

The mounting structure for the tensioner arm 130 is indicated generally at 156 and includes the mounting plate 154 and the mounting shaft 134. A bolt 158 extends through a bore 160 in the shaft 134 and into a threaded bore 162 in the support 145. The bolt head 164 bears against a stepped bushing 166, which in turn urges the shaft 134 towards the support 145. An annular shoulder 168 on the shaft 134 captively maintains a flat surface 170 on the mounting plate 154 facially against a facing flat surface 172 on the support 145 so that the shaft 134 and mounting plate 154 define a unitary, rigid mounting structure.

The mounting portion 148 of the tensioner arm 130 has an annular inner wall part 174 surrounding the shaft 134. A bushing 176 with a radially projecting annular flange 178 thereon is interposed between the wall part 174 and the shaft 134 to smoothly guide rotation of the tensioner arm 130 around the shaft 134.

As in the prior embodiment, the spring 140 is compressed in an axial direction between the plate 154 and wall 180 of the tensioner arm mounting portion 148 to thereby resiliently bias a wall 182 on the mounting portion 148 against the flange 178 on the bushing 176 which abuts the other bushing 166 that is fixed rigidly to the shaft 134.

According to the invention, a stepped friction plate 184 surrounds the shaft 134. The friction plate 184 has a cylindrical first portion 186, which is suitably keyed to the shaft 134 so as to be movable axially relative thereto but fixed against rotation The friction plate 184 has a second cylindrical portion 188, integral with the first portion 186, with an annular, axially facing friction generating surface 190.

According to the invention, a coil spring 192 surrounds the first friction plate portion 186 and is compressed between a surface 194 on the mounting plate 154 and an annular shoulder 196 defined by the second friction plate portion 188. The invention, however, contemplates use of other than a coil spring 192, as for example, a leaf spring, and also that the spring might act against an enlarged part (not shown) of the shaft 134 rather than the plate 154. The spring 192 urges the friction plate 184 axially to the right in FIG. 7 towards the mounting portion wall 182. A friction element 198 is interposed between the friction generating surface 190 and the wall 182 and is preferably secured to the wall 182. Preferably, the friction generating element 198 is a high friction material such as nylon resin, phenol resin, fluorine resin, ABS resin, or the like. The spring 192 causes a damping force to be developed between the annular surface 190 and the friction element 198, whereby pivoting movement of the tensioner arm 130 in each direction of rotation is damped Rotational damping forces on the tensioner arm are produced cooperatively by the springs 140, 192, with the latter damping through the associated friction plate 184 acting against the tensioner arm 130. This redundant damping also diminishes detrimental vibrations as might produce a resonant condition It can be seen that the arrangement of the spring 192 and friction plate 184 produces a compact, yet positive acting structure for damping pivoting of the tensioner arm 130.

The foregoing disclosure of specific embodiments is intended to be illustrative of the broad concepts comprehended by the invention.

We claim:

1. A serpentine belt system comprising:
   an endless belt trained in a circuitous path about a plurality of rotatable pulleys as on an automobile engine in an engine compartment, the pulleys operatively connected to various accessories operable by rotation of the pulleys, the pulleys driven by a frictional force exerted by the driven belt on the pulleys;
   a tensioner arm having an idler pulley thereon for engagement with a surface of the endless belt;
   means for mounting the tensioner arm to a support for pivoting movement in first and second opposite directions relative to the support about an axis; and
   torsion coil spring means formed of a wire and acting between the mounting means and tensioner arm for biasing the tensioner arm in one of first and second directions,
   said wire having a non-circular cross section,
   said tensioner arm having an integrally formed first cylindrical wall radially outside of the torsion coil spring means which acts as an envelope around said coil spring means.

2. The serpentine belt system according to claim 1 wherein said wire has a square cross section.

3. The serpentine belt system according to claim 1 wherein said wire has a rectangular cross section with four equal sides.

4. The serpentine belt system according to claim 1 wherein the coil spring means has opposite ends, said tensioner arm has a mounting body, there is a first wall on the mounting body having a first surface facing in a first axial direction, the mounting means has a second wall with a second surface facing the first surface and the opposite ends of the coil spring means engage the first and second walls.

5. The serpentine belt system according to claim 1 wherein said tensioner arm has an integrally formed second cylindrical wall, said first and second cylindrical walls being in axially overlapping relationship and defining an annular space for the torsion coil spring means.

6. The serpentine belt system according to claim 4 wherein the tensioner arm mounting body has a third surface facing axially oppositely to said first axial direction, the mounting means has a friction producing surface facing in said first axial direction, said mounting means includes means for mounting the tensioner arm mounting body between the second wall and friction producing surface for axial movement relative to the second wall, said coil spring means being compressed between the first and second surfaces to thereby uge the third surface against the friction producing surface to damp pivoting movement of the tensioner arm.

7. The serpentine belt system according to claim 5 including means on the mounting body for holding one of the coil spring means ends and means on the mounting means for holding the other of the coil spring means ends so that the coil spring means can be loaded to produce a torsional force on the tensioner arm.

8. The serpentine belt system according to claim 4 wherein one of said first wall and one coil spring means end has a first axially extending pin and the other of the first wall and one coil spring means end has a first socket for reception of the first pin to maintain the one coil spring means end fixed relative to the first wall to thereby facilitate torsion loading of the coil spring means.

9. The serpentine belt system according to claim 8 wherein a second cooperating pin and pocket similar to that recited in claim 8 are provided on the other coil spring means end and second wall.

10. An apparatus for tensioning a drive belt, said tensioning apparatus comprising:
    a tensioner arm having an idler pulley thereon for engagement with a surface of a drive belt;
    means for mounting the tensioner arm to a support for pivoting movement in first and second opposite directions relative to the support; and
    torsion coil spring means formed of a wire and acting between the mounting means and tensioner arm for biasing the tensioner arm in one of first and second directions,
    said wire having a non-circular cross-section,
    wherein the coil spring means has opposite ends, said tensioner arm has a mounting body, there is a first wall on the mounting body having a first surface facing in a first axial direction, the mounting means has a second wall with a second surface facing the first surface and the opposite ends of the coil spring means engage the first and second walls.

11. An apparatus for tensioning a drive belt, said tensioning apparatus comprising:
    a tensioner arm having an idler pulley thereon for engagement with a surface of a drive belt;
    means for mounting the tensioner arm to a support for pivoting movement in first and second opposite directions relative to the support; and
    torsion coil spring means formed of a wire and acting between the mounting means and tensioner arm for biasing the tensioner arm in one of first and second directions,
    said wire having a non-circular cross-section,
    said apparatus including means urged axially by said torsion coil spring means to produce a damping force resisting pivoting of the tensioner arm.

12. An apparatus for tensioning a drive belt, said tensioning apparatus comprising:
    a tensioner arm having an idler pulley thereon for engagement with a surface of a drive belt;
    means for mounting the tensioner arm to a support for pivoting movement in first and second opposite directions relative to the support;
    first means for biasing the tensioner arm in one of said first and second directions;
    a friction plate;
    second means for mounting the friction plate to the mounting means for axial movement relative thereto and for fixing the friction plate against rotation relative to the mounting means; and
    second means independent of the first biasing means for biasing the friction plate axially towards a part of the tensioner arm to damp pivoting of the tensioner arm.

13. The belt tensioning apparatus according to claim 12 wherein said friction plate has a generally cylindrical configuration 14. The belt tensioning apparatus according to claim 12 wherein said friction plate has a stepped cylindrical configuration with a first portion having a first diameter and a second portion with a second diameter that is larger than the first diameter, the second mounting means mounts the first portion to the first claimed mounting means and the second portion of the friction plate has an annular axially facing surface that is urged axially toward the part of the tensioner arm by the second biasing means.

15. The belt tensioning apparatus according to claim 12 wherein said first claimed biasing means comprises a coil spring formed from a piece of wire having a non-circular cross section.

16. The belt tensioning apparatus according to claim 12 including a friction element disposed between the friction plate and the part of the tensioner arm.

17. The belt tensioning apparatus according to claim 14 wherein the second biasing means comprises a coil spring which surrounds the first portion of the friction plate and bears against an axially facing surface on the second portion of the friction plate.

18. The belt tensioning apparatus according to claim 16 including means for securing the friction element to one of the friction plate and tensioner arm.

19. The belt tensioning apparatus according to claim 16 wherein the friction element is a resin material.

20. An apparatus for tensioning a drive belt, said tensioning apparatus comprising:
a tensioner arm having an idler pulley thereon for engagement with a surface of a drive belt;
means for mounting the tensioner arm to a support for pivoting movement in first and second opposite directions relative to the support;
torsion coil spring means formed of a wire and acting between the mounting means and tensioner arm for pivotably biasing the tensioner arm in one of first and second opposition directions,
said wire having a non-circular cross section;
a friction plate;
means for mounting the friction plate for axial movement relative to the mounting means and for fixing the friction plate against rotation relative to the mounting means; and
means independent of the torsion coil spring for biasing the friction plate axially towards a part of the tensioner arm to damp pivoting of the tensioner arm.

21. The belt tensioning apparatus according to claim 20 including a friction element for cooperating with the friction plate and tensioner arm and means for securing the friction element to one of the friction plate and tensioner arm.

22. The belt tensioning apparatus according to claim 20 in combination with a support wherein the torsion coil spring has spaced ends and there is a pin and slot connection between one of the spaced torsion coil spring ends and one of the support and tensioner arm.

* * * * *